Oct. 28, 1969  J. R. SHUPE  3,474,999
APPARATUS FOR FORMING HOLLOW PLASTIC ARTICLES
Filed June 28, 1967

INVENTOR
James R. Shupe

BY Paul J. Gusbeck
ATTORNEY

United States Patent Office
3,474,999
Patented Oct. 28, 1969

3,474,999
APPARATUS FOR FORMING HOLLOW
PLASTIC ARTICLES
James R. Shupe, Miami, Fla., assignor to United States
Pipe and Foundry Company, Birmingham, Ala., a
corporation of New Jersey
Filed June 28, 1967, Ser. No. 649,599
Int. Cl. B29c 1/06
U.S. Cl. 249—184                                   3 Claims

ABSTRACT OF THE DISCLOSURE

The invention described consists of a core for forming a hollow cylindrical article, such as a pipe coupling, having an enlarged internal diameter portion intermediate its ends, the core comprising a mandrel and a core ring of interlocked segments which can be removed from the article individually after the mandrel is withdrawn from the art.

BACKGROUND OF THE INVENTION

Field of the invention

In the manufacture of plastic pipe and fittings, for example PVC plastic pipe and fittings, it is the practice to form an enlarged socket end portion for receiving the plain end of another pipe and joining the two pipes together. Oftentimes it is necessary to provide the interior of the socket with a groove having a larger diameter than the opening of the socket, so that a simple cylindrical, tapered or stepped mandrel which can merely be pulled from the pipe or fitting cannot be used. Accordingly a core must be provided which will form the inside of the article but which can be removed through the smaller end opening.

Prior art

A heat resistant rubber ring has been used in conjunction with a mandrel to form a pipe socket having a generally cylindrical inside surface with a gasket groove of enlarged diameter spaced inwardly from one end. The rubber ring is placed on the mandrel, the pipe socket is molded around the mandrel and rubber ring, the mandrel is first withdrawn and then the rubber ring is removed to leave a gasket groove in the socket. The rubber ring must be replaced frequently because of heat degradation, and it is difficult to remove from the completed socket. Also, the elastomeric properties of the rubber ring make it very difficult to mold sockets without deforming the ring from the intended shape, and consequently the flow of plastic material in the mold must be very carefully controlled.

SUMMARY OF THE INVENTION

The present invention provides an apparatus and method for forming enlargements in hollow plastic structures such as pipe sockets. A permanent metal molding ring is provided in segments which when fitted together can be dismantled by moving the segments relative to one another in a direction toward the center of the ring but not in a direction away from the center of the ring. This ring is mounted on a mandrel, the socket is formed around the mandrel and ring, the mandrel is withdrawn from the socket, and the ring segments are removed one at a time by moving them toward the center of the socket.

DESCRIPTION OF THE PREFERRED EMBODIMENTS

Figures 2, 3:
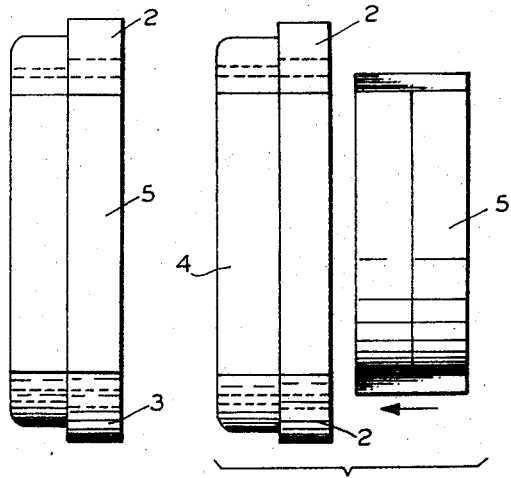
FIGURE 2 illustrates a side view of the molding ring.
FIGURE 3 illustrates how the sections of the new molding ring may be assembled and disassembled in the axial direction.

Referring to FIGURES 2 and 3, it can be seen that the new molding ring 1 comprises four segments which form a complete ring when fitted together, each segment having a maximum length which is less than the minimum inside diameter of the assembled molding ring. Two of these segments 2 and 3 which are diametrically opposite each other have a mortise shaped cut out on the side toward the center of the ring, and the other two diametrically opposite segments 4 and 5 have a partial tenon 6 at each end. When the partial tenons are placed in the mortises of segments 2 and 3 and segments 4 and 5 are moved outwardly a complete ring is formed, and so long as a force is diametrically applied across the ring tending to pull segments 4 and 5 apart, the segments will remain locked together and the ring can be picked up and slipped over a mandrel. Once the ring is mounted on a mandrel so that segments 5 and 6 cannot move inwardly toward the center of the ring, it is effectively held together by two mortise and tenon joints.

Figure 4:
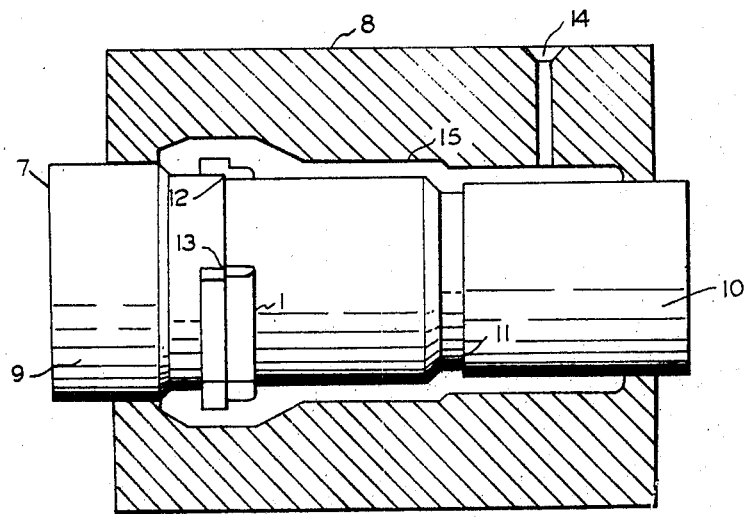
FIGURE 4 illustrates the new molding ring in partial section mounted on a mandrel which is seated in one-half of a mold cavity.

Turning to FIGURE 4, the molding ring 1 is shown mounted on a mandrel 7 which is shown in place in one-half of a mold 8. Since there is a constriction 9 at about the midpoint of the pipe socket in addition to the enlargement formed by ring 1 the mandrel 7 is formed of a left portion 10 and right portion 11 which enter the mold from the left and right respectively, their ends, having been suitably shaped, abut to form the cavity for the constriction 9. The ring 1, which is mounted on left portion 9 of the mandrel before it is assembled in the mold, can be assembled off the mandrel, picked up as a unit and slipped over the mandrel, or it can be assembled about the mandrel by moving the segments axially with respect to each other as shown in FIGURE 3.

In order to properly position the molding ring on the mandrel, a small shoulder 12 is formed on the mandrel and a similar shoulder 13 is formed on the inside of the molding ring. The molding ring is properly positioned and the segments properly aligned when the shoulder on each segment is in contact with the shoulder on the mandrel. Of course, the ring need not be provided with a shoulder, instead, its end face can abut against the stop on the mandrel. The sprue 14 through which the plastic material to be molded is injected into the mold is on the opposite side of the ring from the shoulder 12 so that the flow of material in the cavity will hold the ring 1 against shoulder 12.

In practicing the invention, the mold half 8 shown in FIGURE 4 and its matching half are mounted in an injection molding unit together with the mandrel portions 9 and 10. At the start of a molding cycle the mold halves are spaced apart and mandrel portions are separated. Ring 1 is mounted on the mandrel portion 9, and the mold is assembled by bringing the mandrel portions and mold halves together. Plastic material is injected into the mold and around the core formed by the two mandrels and the molding ring and when the socket 15 is formed the mandrel portions are withdrawn from the mold. As mandrel portion 9 is withdrawn, molding ring 1 is left in the socket. The mold halves are separated and the finished socket removed.

Figure 1:
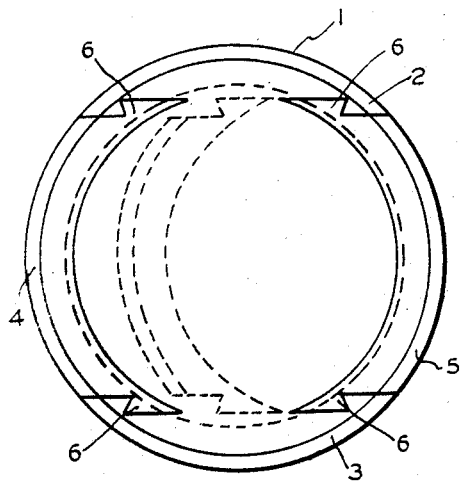
FIGURE 1 illustrates a front view of the new molding ring and by means of chain lines indicates the manner in which one section can be moved radially inwardly.

The molding ring is removed from the socket by first moving segment 4 toward the axis of the socket until it is free of the gasket groove, as illustrated in chain lines in FIGURE 1, and then removing it through the end opening of the socket. After one of the segments has been removed the other three segments are easily removed in a similar manner. To increase production rates two rings are used, each in alternate cycles; the ring in a finished socket is removed and assembled while the next socket is being molded. This makes a ring available as soon as it is needed, and because the injection molding equipment is not left waiting while a ring is being removed, maximum production rates are attained.

From the foregoing it is apparent that the present invention permits economical production of cylindrical structure having an enlarged internal diameter intermediate its ends. While there have been illustrated and described presently preferred embodiments of the invention, they have been set forth as illustrations of the invention and not as limitations on the invention. It will be apparent to those skilled in the art that changes may be made in the form of the apparatus and the procedures described without departing from the scope and spirit of the invention as set forth in the appended claims.

I claim:

1. A core for forming the inside of a hollow cylindrical article having an open end through which the core is removed from the article and an enlarged internal diameter axially inward of the open end comprising a generally cylindrical mandrel and a separate ring mounted on the mandrel for forming the enlarged inside diameter, said ring being formed of interlocked segments which cannot be moved either radially inwardly or outwardly while the ring is mounted on said mandrel but which can be removed individually from the inside of an article formed about the core after first removing said mandrel by moving each of the segments radially inwardly to the center of the article and then withdrawing it through the open end of the article.

2. A core in accordance with claim 1 wherein the ring is formed of four segments two of which have a mortise facing the center of the ring and two of which have partial tenons on each end whereby the four segments can be assembled about the mandrel and interlocked by the formation of two mortise and tenon joints.

3. Apparatus in accordance with claim 2 wherein each segment is shorter than the diameter of the opening at the end of the article formed about the core.

References Cited
UNITED STATES PATENTS

| | | |
|---|---|---|
| 2,178,015 | 10/1939 | Brunett. |
| 2,712,447 | 7/1955 | Steinhardt. |
| 2,728,127 | 12/1955 | Armstrong. |
| 2,955,322 | 10/1960 | Hite. |
| 2,970,343 | 2/1961 | Johnson et al. |
| 3,339,242 | 9/1967 | Lamb. |

J. HOWARD FLINT. JR., Primary Examiner

U.S. Cl. X.R.

18—45; 249—151